US012122181B2

(12) United States Patent
Mazingue et al.

(10) Patent No.: US 12,122,181 B2
(45) Date of Patent: Oct. 22, 2024

(54) RETRACTABLE ELEMENT FOR A WRITING IMPLEMENT

(71) Applicant: Société BIC, Clichy (FR)

(72) Inventors: Laurent Mazingue, Clichy (FR); Samuel Malinverni, Clichy (FR)

(73) Assignee: Société BIC, Clichy (FR)

( * ) Notice: Subject to any disclaimer, the term of this patent is extended or adjusted under 35 U.S.C. 154(b) by 43 days.

(21) Appl. No.: 17/607,500

(22) PCT Filed: Apr. 29, 2020

(86) PCT No.: PCT/IB2020/054046
§ 371 (c)(1),
(2) Date: Oct. 29, 2021

(87) PCT Pub. No.: WO2020/222141
PCT Pub. Date: Nov. 5, 2020

(65) Prior Publication Data

US 2022/0227164 A1 Jul. 21, 2022

Related U.S. Application Data

(60) Provisional application No. 62/840,759, filed on Apr. 30, 2019.

(51) Int. Cl.
*B43K 24/16* (2006.01)
*B43K 24/14* (2006.01)
*B43K 29/02* (2006.01)

(52) U.S. Cl.
CPC .............. *B43K 24/16* (2013.01); *B43K 24/14* (2013.01); *B43K 29/02* (2013.01)

(58) Field of Classification Search
CPC ........ B43K 24/16; B43K 24/08; B43K 24/14; B43K 29/02; B43L 19/0068
See application file for complete search history.

(56) References Cited

U.S. PATENT DOCUMENTS 300,709 A * 6/1884 Huntoon ................ B43K 29/02 401/117
2,417,925 A 3/1947 Jakob
2,493,665 A 1/1950 Gagnon
2,495,178 A 1/1950 Norlin
2,690,735 A 10/1954 Garcia
(Continued)

FOREIGN PATENT DOCUMENTS

CH 674490 6/1990
CN 1672958 A 9/2005
(Continued)

OTHER PUBLICATIONS

Chinese Office Action for corresponding Chinese Patent Application No. 2020800234262, 13 pages, dated Nov. 21, 2022.
(Continued)

*Primary Examiner* — J C Jacyna
(74) *Attorney, Agent, or Firm* — Ruggiero McAllister & McMahon LLC

(57) ABSTRACT

A writing implement has a writing tip extending from the barrel for writing and a rubbing element that surrounds the writing tip that is selectively extendable from a housing to erase or change color of the writing and retractable into the housing for storage.

16 Claims, 17 Drawing Sheets

(56) References Cited

U.S. PATENT DOCUMENTS

| | | | | |
|---|---|---|---|---|
| 3,146,758 | A | 9/1964 | Alter | |
| 3,262,425 | A | 7/1966 | Waugh | |
| 3,941,488 | A | 3/1976 | Maxwell | |
| 4,376,590 | A | 3/1983 | Kuo | |
| 5,221,152 | A | 6/1993 | Chuang | |
| 5,774,931 | A | 7/1998 | Coinon et al. | |
| 5,897,266 | A | 4/1999 | Robert | |
| 5,947,624 | A | 9/1999 | Davignon | |
| 6,062,753 | A | 5/2000 | Hadtke et al. | |
| 6,722,804 | B2 | 4/2004 | Lee | |
| 6,874,188 | B2 | 4/2005 | Johnson et al. | |
| 6,915,554 | B2 | 7/2005 | Yang | |
| 6,935,799 | B2 | 8/2005 | Kageyama | |
| 7,137,751 | B2 | 11/2006 | Candelora et al. | |
| 7,284,927 | B2 | 10/2007 | Kageyama | |
| 7,329,063 | B2 | 2/2008 | Kato | |
| 7,503,716 | B2 | 3/2009 | Herrmann et al. | |
| 7,708,486 | B2 | 5/2010 | Keda | |
| 8,214,969 | B2 | 7/2012 | Curtis | |
| 8,222,183 | B2 | 7/2012 | Ono | |
| 8,282,299 | B2 | 10/2012 | Ito et al. | |
| 8,322,937 | B2 | 12/2012 | Imamura | |
| 8,529,683 | B2 | 9/2013 | Fujita | |
| 8,845,799 | B2 | 9/2014 | Fujita | |
| 2005/0069371 | A1 | 3/2005 | Lutgen et al. | |
| 2006/0027518 | A1 | 2/2006 | Keda | |
| 2007/0189836 | A1 | 8/2007 | Senga et al. | |
| 2008/0292385 | A1 | 11/2008 | Wase et al. | |
| 2010/0098475 | A1 | 4/2010 | Fujita et al. | |
| 2010/0247223 | A1 | 9/2010 | Ribi | |
| 2012/0003030 | A1 | 1/2012 | Kish et al. | |
| 2012/0141188 | A1 | 6/2012 | Fujita | |
| 2012/0308290 | A1 | 12/2012 | Ito | |
| 2013/0121744 | A1 | 5/2013 | Imamura et al. | |
| 2013/0210622 | A1 | 8/2013 | Ono | |
| 2014/0331448 | A1 | 11/2014 | Ohtsuka | |
| 2015/0033199 | A1 | 1/2015 | Bickford et al. | |
| 2015/0043956 | A1* | 2/2015 | Rolion | B43K 21/18 401/82 |
| 2015/0184003 | A1* | 7/2015 | Li | B43K 7/005 401/109 |
| 2018/0333980 | A1* | 11/2018 | Namiki | B43K 24/08 |
| 2019/0118573 | A1* | 4/2019 | Nelson, Jr. | B43L 19/00 |

FOREIGN PATENT DOCUMENTS

| | | | | |
|---|---|---|---|---|
| CN | 203876431 U | | 10/2014 | |
| EP | 4000946 | * | 5/2022 | B43K 29/02 |
| FR | 2869834 | * | 5/2004 | B43K 29/02 |
| JP | 2012030447 A | | 2/2012 | |
| JP | 2015134470 A | | 7/2015 | |

OTHER PUBLICATIONS

International Preliminary Report on Patentability dated Nov. 2, 2021 in corresponding International PCT Patent Application PCT/IB2020/054046, 6 pages.

International Search Report dated Jun. 26, 2020 in corresponding International PCT Patent Application PCT/IB2020/054046, 3 pages.

Written Opinion dated Jun. 26, 2020 in corresponding International PCT Patent Application PCT/IB2020/054046, 5 pages.

* cited by examiner

RETRACTABLE ELEMENT FOR A WRITING IMPLEMENT

CROSS REFERENCE TO RELATED APPLICATIONS

This application is a National Stage Application of International Application No. PCT/IB2020/054046, filed on Apr. 29, 2020, and which claims priority to U.S. provisional patent application U.S. 62/840,759, filed on 30 Apr. 2019 each of their contents being incorporated herein by reference.

1. Field of the Disclosure

The present disclosure relates to writing implements having a writing tip and a rubbing element that can rub against markings from the writing tip to erase or change the color thereof. More particularly, the present disclosure relates to a writing implement having a writing tip that extends from a barrel for marking and a rubbing element that surrounds the writing tip that is extendible from a housing to erase or change color of the markings and retractable into the housing for storage.

2. Description of the Related Art

Writing implements have erasers or friction members to erase markings or change color of markings, respectively. Typically, erasers and friction members are attached to a writing implement so that the eraser or friction member is always exposed. Such exposure can lead to damage or accumulation of dirt leading to diminished effectiveness for erasing or changing color of markings. In particular, these friction members and erasers are easily damaged or accumulate dirt when unintentionally contacting other items and surfaces.

Accordingly, there is a need to address these disadvantages of currently available writing implements.

SUMMARY OF THE DISCLOSURE

The present disclosure provides a writing implement having a writing tip extending from the barrel for marking, and a rubbing element that surrounds the writing tip and that is selectively extendable from a housing to erase or change color of the marking and retractable into the housing for storage.

The present disclosure also provides such a writing implement in which the extension and retraction of the writing tip is independent of the extension and retraction of the rubbing element.

The present disclosure further provides such a writing implement in which the extension and retraction of the writing tip is opposite to the extension and retraction of the rubbing element.

The present disclosure still further provides such a writing implement in which the extended position of the rubbing element is maintained, specifically by a blocking system.

The present disclosure yet further provides such a writing implement in which the rubbing element is maintained in the retracted position, specifically by a blocking system, when the user moves the writing tip to the extended position.

The above-described features of the present disclosure will be appreciated and understood by those skilled in the art from the following detailed description, drawings, and appended claims.

DETAILED DESCRIPTION OF THE DISCLOSURE

Figure 1:
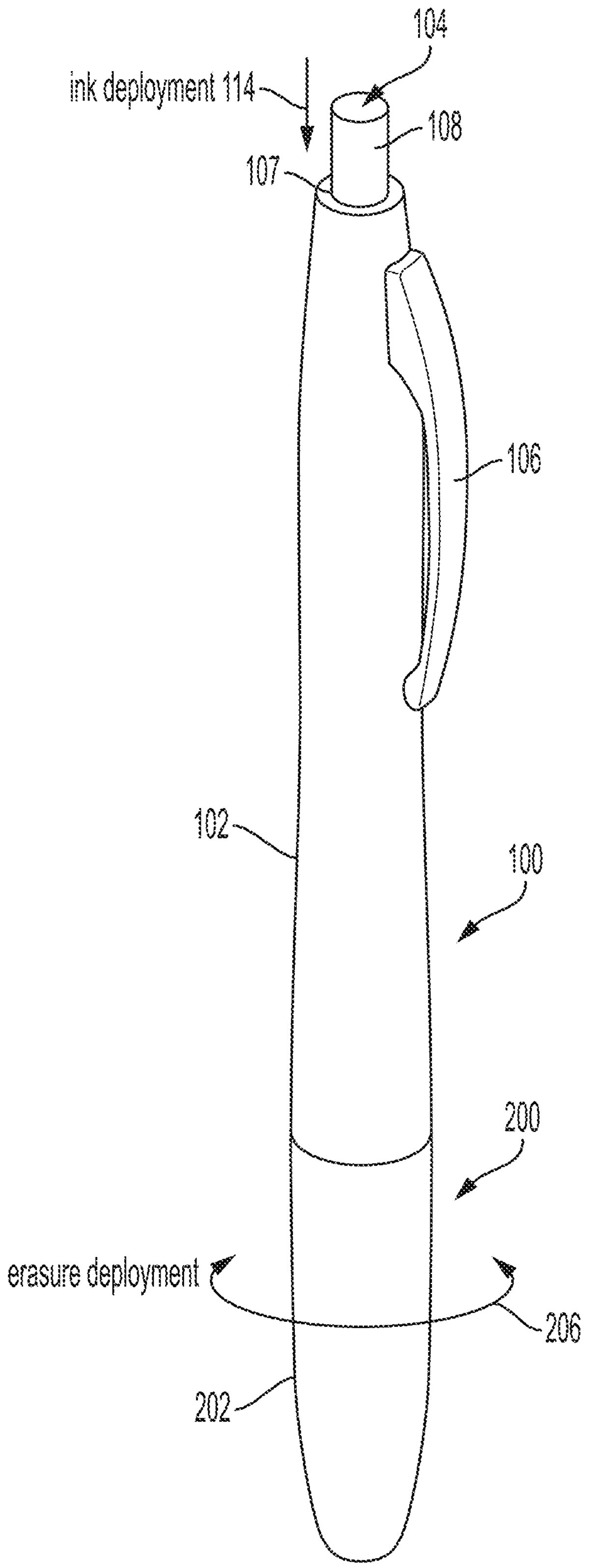
FIG. 1 is a top, side perspective view of a first embodiment of a writing implement having a writing tip in a stored position and a rubbing element in a retracted position.
Figure 2:
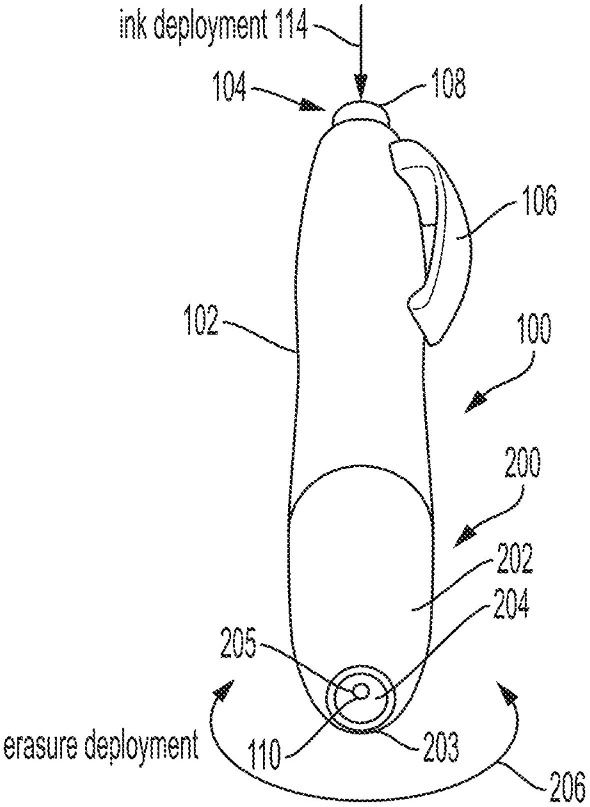
FIG. 2 is a bottom, side perspective view of the first embodiment of the writing implement of FIG. 1.

Referring to FIGS. 1 and 2, there is provided a writing implement generally represented by reference numeral 100. Writing implement 100 has a barrel 102, a writing tip assembly 104 and a rubbing element assembly 200. Writing implement 100 can also have a clip 106.

Writing implement 100 may have thermochromic ink to write on a substrate such as paper. The thermochromic ink of writing implement 100 has a color that is changed when heat is applied to the markings. Heat is applied to the markings by a rubbing element 204 rubbing the paper so that the friction between the rubbing element 204 and the paper generates heat. In examples, a peelable ink such as inks with two phases, a dye and a resin, may be used. In this type of ink the color can be changed as the dye comes into the paper and the resin gets on to the paper, forming a different layer such that when one erases, the ink is peeled, particularly the resin layer is peeled thus making visible the dye layer which may have a different color. In examples, a combination of a thermochromic ink and a peelable ink may be used. Alternatively, writing implement 100 can have other erasable inks in which rubbing a rubbing element or eraser can erase or change the color of the ink, or writing implement 100 can use pencil lead and rubbing element assembly 200 can extend and retract as an eraser. Rubbing element assembly 200 selectively extends rubbing element 204 to rub the substrate and retracts a rubbing element 204 for storage. It is undesirable for rubbing element 204 to be exposed at all times because such exposure can lead to damage or accumulation of dirt leading to diminished effectiveness for erasing or changing color of markings.

Still referring to FIGS. 1 and 2, writing tip assembly 104 selectively extends a writing tip 110 for writing and retracts writing tip 110 for storage. Writing tip assembly 104 has a button 108 that moves into and out of barrel 102 through a hole 107 to extend writing tip 110 out of barrel 102 for writing and retract writing tip 110 into barrel 102 for storage. Writing tip assembly 104 selectively extends and retracts writing tip 110 by a click mechanism that is also called a ratchet mechanism or knock mechanism that is known in the art, and, thus, not discussed in detail herein. Writing tip 110 is shown as a ballpoint pen tip. However, writing tip 110 can be any writing tip, for example, a marker nib, mechanical pencil, or other writing tip.

Figure 3:
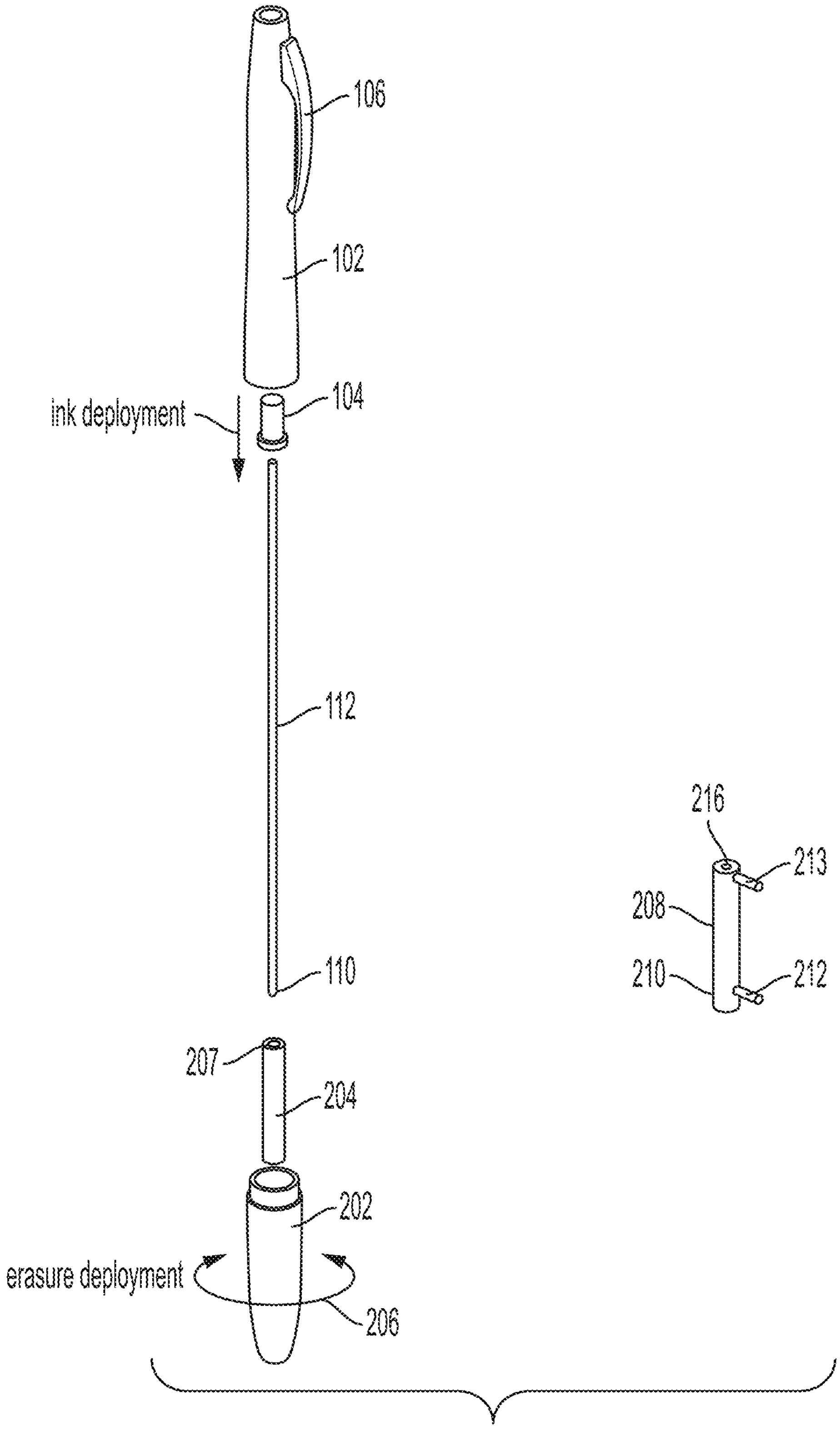
FIG. 3 is an exploded top, side perspective view of the first embodiment of the writing implement of FIG. 1.

Rubbing element assembly 200 has a housing 202 and rubbing element 204. Housing 202 has a hole 203. Housing 202 is rotatable relative to barrel 102, as shown by arrows 206, to selectively extend rubbing element 204 through hole 203 out of housing 202 and retract rubbing element 204 inside of housing 202. Rubbing element 204 is a material that changes the color of thermochromic ink when rubbing element 204 rubs the thermochromic ink that is on paper or other substrate, an eraser material that erases pencil marks, or other eraser material that erases erasable inks. A material of rubbing element 204 is, for example, kneading silicone material (e.g. made by Toray Dow Chemical Silicone Co., Ltd., Product Name: DY32-7040U) to which can been added purple pigment (made by Shin-Etsu Chemical, Product Name: KE-Color R2301), 0.09 parts, and red pigment (made by Shin-Etsu Chemical, Product Name: KE-Color X-93-942), 0.13 parts. In general, any TPE (thermoplastic elastomer) materials having a Shore A hardness lower than 100 and that changes the color of thermochromic ink and/or a peelable ink may be used. Examples of such materials for the rubbing element 204 may be thermoplastic polyurethane polyether marketed as DESMOPAN DP 6064 A, 65 Shore A manufactured by COVESTRO. Still other examples of a material of rubbing element 204 may be cork and/or DESMOPAN DP 6084 A, with for example 84 Shore A manufactured by COVESTRO. In circumstances materials having 30-100 Shore A hardness may also be used. Rubbing element 204 may also be a tube forming a passage from opening 205 to opening 207 (FIG. 3). The above examples shall not limit the scope of this disclosure.

Referring to FIG. 3, writing tip 110 is connected to a cartridge 112 that holds thermochromic ink. Rubbing element assembly 200 has a rubbing element connector 208. Rubbing element connector 208 has a connecting portion 210, a protrusion 212 and an extension 213. Connecting portion 210 has a hole 216. Protrusion 212 and extension 213 each protrude from connecting portion 210. Connecting portion 210 connects to rubbing element 204 so that rubbing element 204 is fixed with rubbing element connector 208.

Figure 4A:
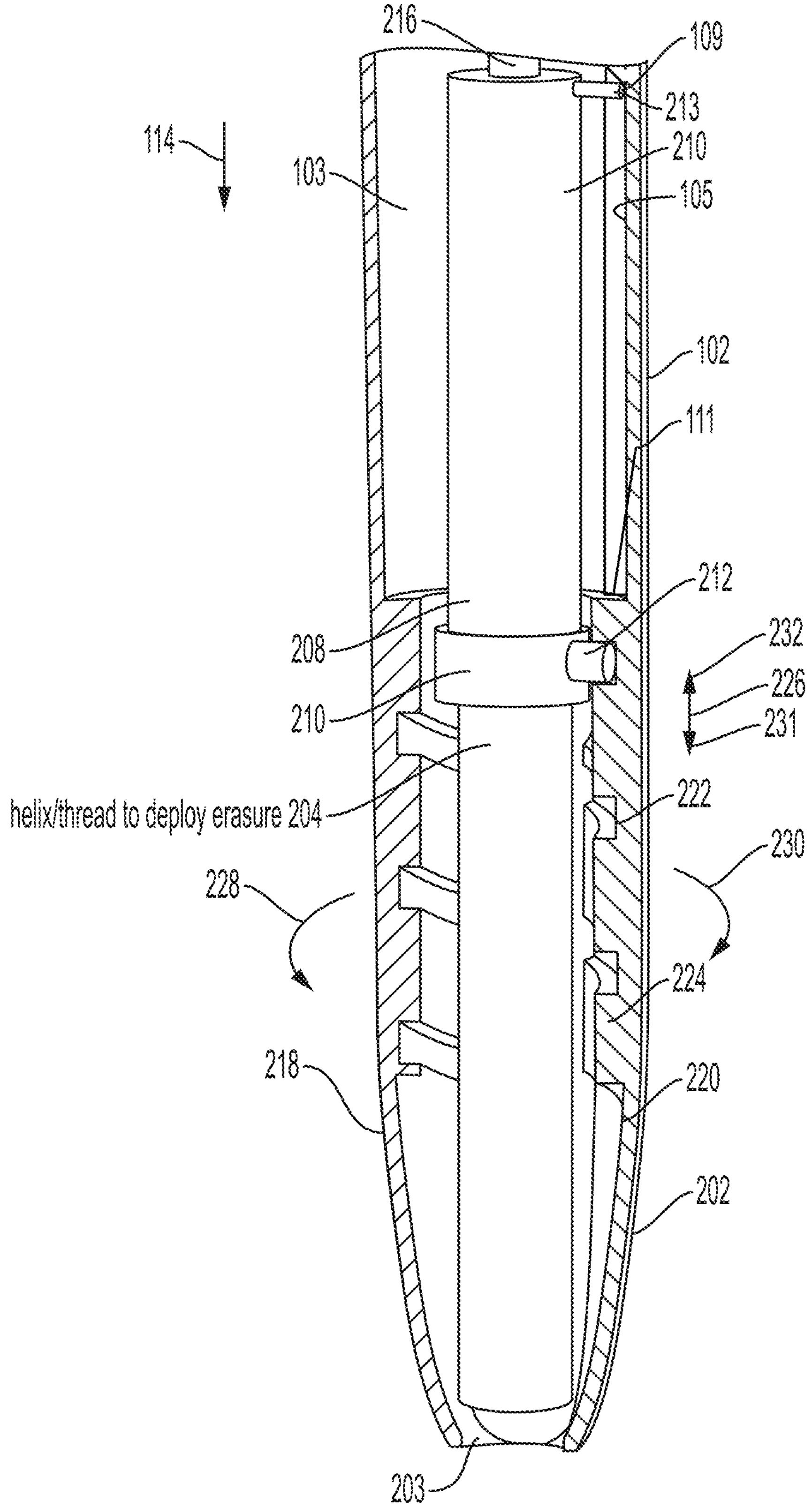
FIG. 4A is a partial cross-sectional view of the first embodiment of the writing implement of FIG. 1.

Referring to FIG. 4A, housing 202 has an exterior surface 218 and an interior surface 220 opposite exterior surface 218. Exterior surface 218 can be gripped by a user. Interior surface 220 has a groove 222 that is a helix shape. Groove 222 is formed in a tube 224 that connected to interior surface 220 of housing 202. Alternatively, groove 222 can be formed directly in interior surface 220. Protrusion 212 fits in groove 222 so that protrusion 212 is movable along groove 222. Protrusion 212 and connecting portion 210 are sized large enough so that rubbing element connector 208 cannot be removed from groove 222 to maintain a connection between rubbing element connector 208 and housing 202 and also connecting rubbing element 204 to housing 202 by rubbing element connector 208. Cartridge 112 is positioned through hole 216 and passes into the passage in rubbing element 204.

Barrel 102 has an interior surface 103. Interior surface 103 has a groove 105. Groove 105 has a shape and size to allow vertical movement of extension 213 between a first end 109 of groove 105 and a second end 111 of groove 105. Groove 105 has a shape and size to prevent rotational movement of extension 213 relative to barrel 102. Rubbing element connector 208 that has protrusion 212 enters in groove 222 to enable movement of rubbing element connector 208 by turning barrel 102 versus rubbing element assembly 200, then rubbing element connector 208 is keyed/blocked in rotation. In other words, rotation is prevented by barrel 102 so that rubbing element connector 208 can only translate in directions shown by arrows 226 relatively to barrel 102. Otherwise, rubbing element connector 208 will rotate without translating relatively to barrel 102 and rubbing element 204 will not emit from hole 203.

Alternatively, rubbing element connector 208 can omit extension 213 and barrel 102 can omit groove 105 and hole 216 and cartridge 112 can be sized to prevent rotation between rubbing element connector 208 and cartridge 112 and allow relative movement between rubbing element connector 208 and cartridge 112 along direction 226 along a length of cartridge 112 with rotation prevented by a friction fit of cartridge 112 inside hole 216 of rubbing element connector 208. Another alternative example, is that the cartridge 112 can have vertical protrusions or grooves that mate with corresponding protrusions or grooves formed inside hole 216 of rubbing element connector 208. The click mechanism has a spring that urges cartridge 112 toward hole 107 in barrel 102 that is generally located in the nose; however, this is not standard. The spring of the knock mechanism can be located more upward if a crimp/shoulder is located higher on the cartridge. The spring of the click mechanism is positioned above a rubbing element connector 208 of rubbing element assembly 200 so as not to interfere in any way with rubbing element 204, for example, by placing a shoulder inside of barrel 102 for one end of the spring to abut against and a crimp on cartridge 112 above rubbing element connector 208 for an opposite end of the spring to abut against.

Figure 4B:
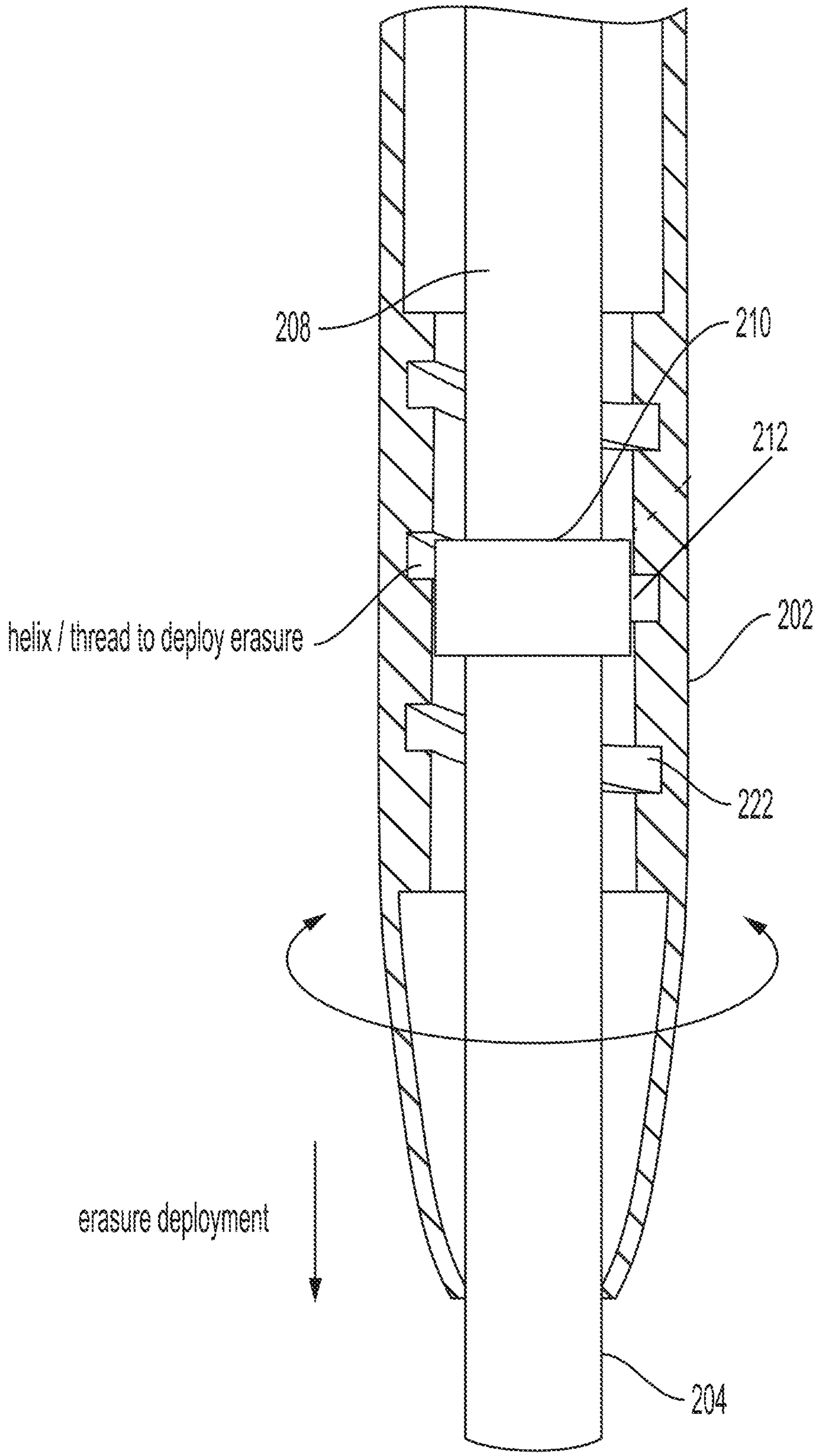
FIG. 4B is a partial cross-sectional view of the first embodiment of the writing implement of FIG. 1 having the rubbing element in an extended position.
Figure 4C:
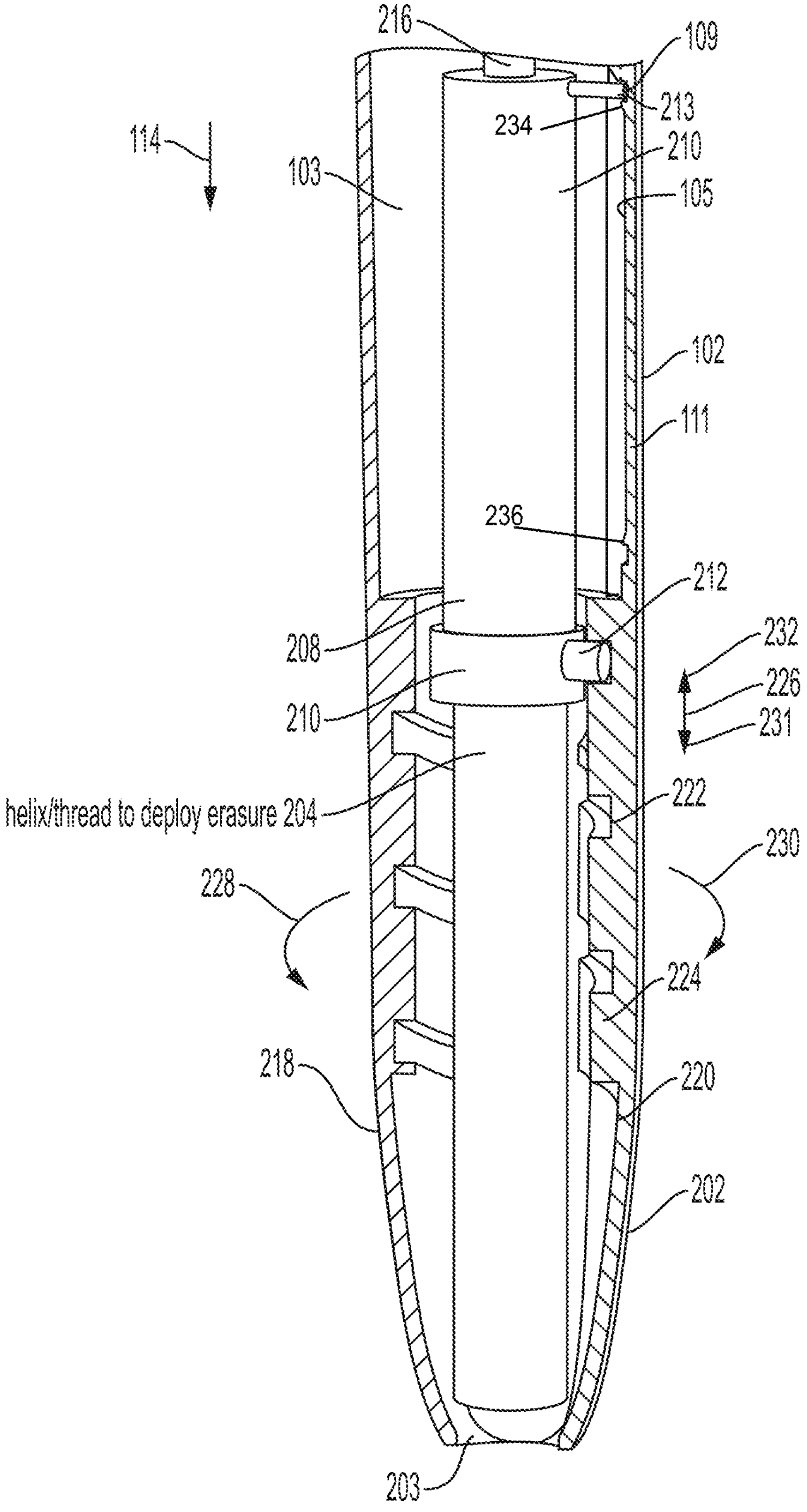
FIG. 4C is a partial cross-sectional view of the first embodiment of the writing implement of FIG. 1 modified from FIG. 4A to include stoppers.

In use, to extend a portion of rubbing element 204 outside of housing 202 to an extended position from a retracted position, a user grips housing 202 and rotates housing 202 in a direction as shown by arrow 230, the user grips barrel 102 rotating barrel 102 in a direction as shown by arrow 228, or the user grips both housing 202 to rotate housing 202 in the direction as shown by arrow 228 and the user grips barrel 102 to rotate barrel 102 in the direction as shown by arrow 230, to move protrusion 212 along groove 222 moving rubbing element 204 in a axial direction as shown by arrow 231. Since extension 213 is in groove 105, rubbing element connector 208 and rubbing element 204 that is connected to rubbing element 204 do not rotate relative to barrel 102 moving protrusion 212 along groove 222 and extension 213 along groove 105 to move rubbing element connector 208 and rubbing element 204 in direction 231 relative to barrel 102. Rubbing element connector 208 and rubbing element 204 move in direction 231 relative to barrel 102 until the user stops applying rotation, until a barrier in groove 222 blocks further movement of protrusion 212 in groove 222, or until extension 213 abuts second end 111 of groove 105. The barrier in groove 222 that blocks further movement or second end 111 of groove 105 is positioned so that movement of rubbing element 204 is stopped when rubbing element 204 has a desired portion outside of housing 202. In further examples, as shown in FIG. 4C, to partially lock the movement of the rubbing element connector 208 and rubbing element 204, a stopper, e.g., first stopper 234 and a second stopper 236, in the form of protrusions are able to make a click effect (or snap fit or press fit) that may be located in groove 105 and/or groove 222. The provision of the stopper allows locking the rubbing element 204 in a deployed and in a retracted position. Thus, no accidental retraction of deployment may occur while in use. The stopper may comprise an inclined portion before the protrusion to serve for an easier use. The user shall apply a little more force in order to lock the rubbing element 204 in the deployed or retracted position. By this the rubbing element 204 becomes safer for use. Protrusion 212 can move along groove 222 until the portion of rubbing element 204 is extended outside of housing 202 as shown in FIG. 4B. Movement of rubbing element connector 208 and rubbing element 204 is limited by groove 222 preventing movement of protrusion 212 in the direction as shown by arrow 232 so that rubbing element 204 is maintained in the extended position when the user is erasing with rubbing element 204. This forms a blocking system for withstanding the vertical erasing force when the user is erasing with rubbing element 204.

To retract the portion of rubbing element 204 outside of housing 202 from the extended position, the user can grip: housing 202 and rotates housing 202 in the direction as shown by arrow 228, or barrel 102 rotating barrel 102 in the direction as shown by arrow 230, or both housing 202 to rotate housing 202 in the direction as shown by arrow 228 and barrel 102 to rotate barrel 102 in the direction as shown by arrow 230, to move protrusion 212 along groove 222 moving rubbing element 204 in a direction as shown by arrow 232. Since extension 213 is in groove 105, rubbing element connector 208 and rubbing element 204 that is connected to rubbing element 204 do not rotate relative to barrel 102 moving protrusion 212 along groove 222 and extension along groove 105 to move rubbing element connector 208 and rubbing element 204 in direction 232 relative to barrel 102. Protrusion 212 moves along groove 222 until the user stops applying rotation, until a barrier in groove 222 blocks further movement of protrusion 212 in groove 222, or until extension 213 abuts first end 109 of groove 105. The barrier in groove 222 that blocks further movement or first end 109 of groove 105 is positioned so that movement of rubbing element 204 is stopped when rubbing element 204 is completely inside housing 202.

Referring to FIG. 1, when the user applies a force to button 108 in a direction as shown by arrow 114 and releases the force when the writing tip 110 is in a stored position, cartridge 112 and writing tip 110 are moved in the direction as shown by arrow 114 to a writing position. Referring back to FIG. 4A, when button 108 is moved in the direction as shown by arrow 114 in FIG. 1, cartridge 112 and writing tip 110 are moved through hole 216 of rubbing element connector 208 and through opening 205 shown in FIG. 1, the passage and opening 207 of rubbing element 204 shown in FIG. 3. Movement of rubbing element connector 208 and rubbing element 204 is limited by groove 222 preventing movement of protrusion 212 in the direction as shown by arrow 114 so that rubbing element 204 is maintained inside of housing 202 when button 108 is moved in the direction as shown by arrow 114. When the user applies a force to button 108 in the direction as shown by arrow 114 and releases the force when the writing tip 110 is in the writing position, cartridge 112 and writing tip 110 are moved in a direction opposite to the direction as shown by arrow 114 to the stored position. Again, movement of rubbing element connector 208 and rubbing element 204 is limited by groove 222 preventing movement of protrusion 212 in the direction opposite to the direction as shown by arrow 114 so that rubbing element 204 is maintained inside of housing 202 when button 108 is moved. Accordingly, when user actuates on button 108, rubbing element 204 does not move. As discussed herein, writing tip assembly 104 selectively extends and retracts writing tip 110 by the knock mechanism. The writing implement can be a top actuation as shown in FIG. 1, a side actuation or a stick.

Thus, rubbing element 204 is initially disposed inside housing 202. Rubbing element 204 is operated by rubbing element assembly 200 that is separate from writing tip assembly 104. Rubbing element 204 will project (and thus retract) from inside of housing 202 and to outside of a front end of housing 202 for use. Movement of rubbing element 204 is similar to a moving sleeve, namely rubbing element 204 and writing tip 110 are concentric with writing tip 110 being disposed inside of rubbing element 204 and writing tip 110 is projected/retracted from inside of rubbing element 204. Writing tip assembly 104 is disposed at a rear end of barrel 102. Rubbing element assembly 200 is a portion of the front end of writing implement 100. The portion of the front end, namely, housing 202, "twists/rotates" to initiate a projection/retraction movement of rubbing element 204 from inside of housing 202 to the outside of the front end of housing 202 and vice-versa. Accordingly, rubbing element 204 can be selectively stored and exposed for use in writing implement 100 avoiding damage or accumulation of dirt that can lead to diminished effectiveness for erasing or changing color of markings.

Figure 5:
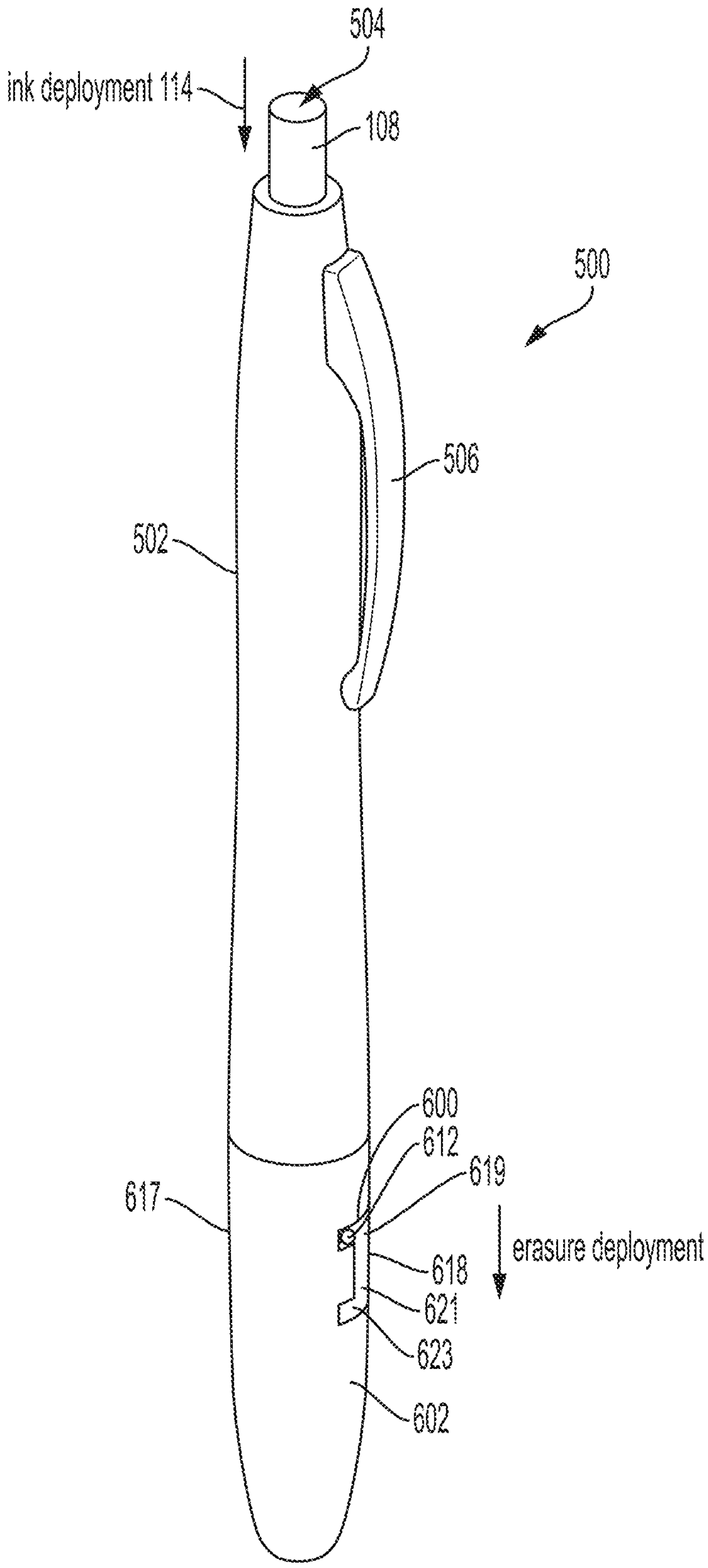
FIG. 5 is a top, side perspective view of a second embodiment of a writing implement having a writing tip in a stored position and a rubbing element in a retracted position.

Referring to FIG. 5, a second embodiment of a writing implement 500 that has a writing tip assembly 504 and a rubbing element assembly 600 of the present disclosure is shown. Writing implement 500 has a barrel 502, writing tip assembly 504 and a rubbing element assembly 600. Writing implement 500 can also have a clip 506. Writing tip assembly 504 is the same as writing tip assembly 104. Accordingly, features that are the same for writing tip assembly 504 and writing tip assembly 104 have the same reference numerals. Writing tip 110 is connected to cartridge 512 that holds thermochromic ink.

Figure 6:
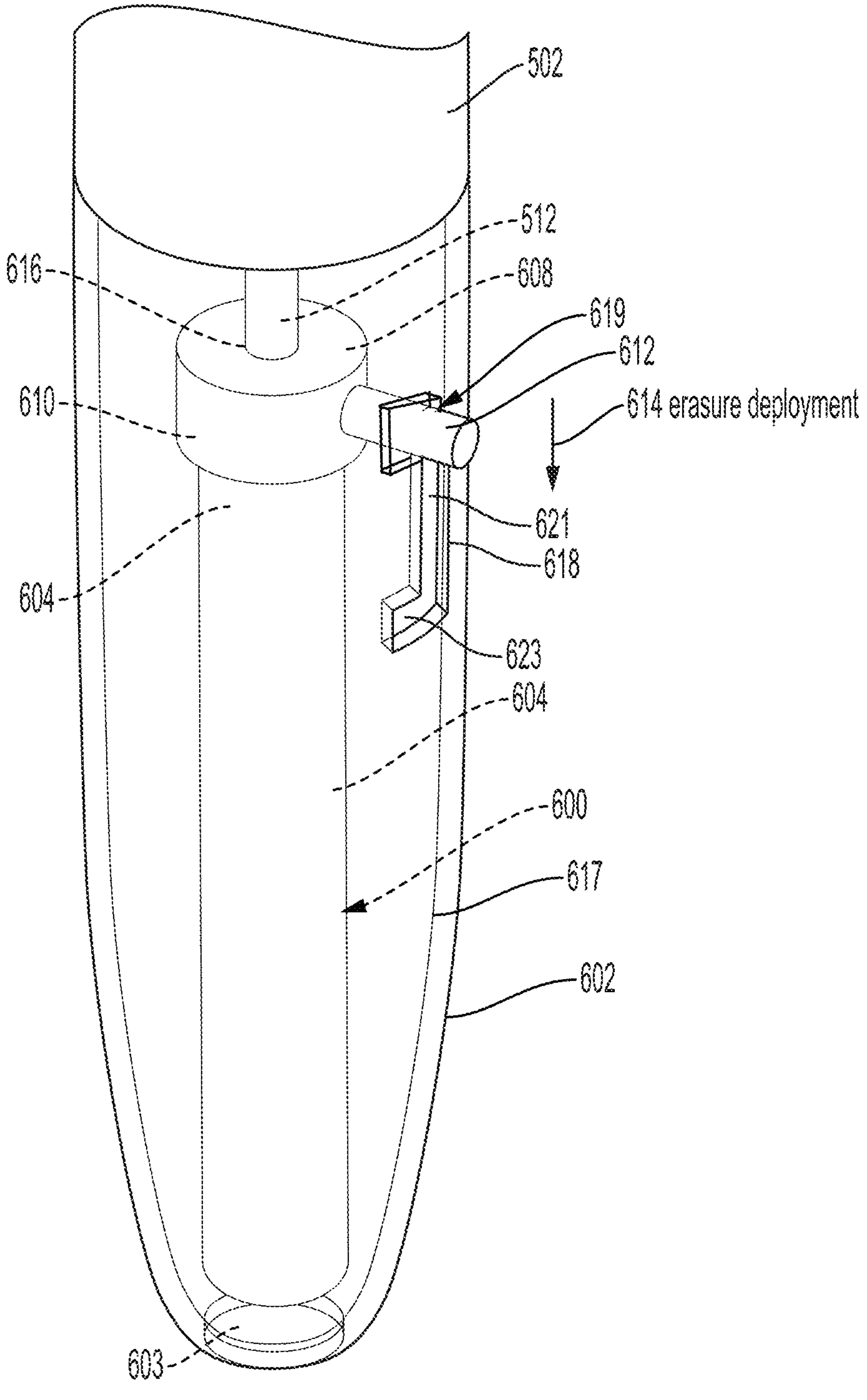
FIG. 6 is a partial top, side perspective view of the second embodiment of the writing implement of FIG. 5 showing a housing as transparent.

Referring to FIG. 6, rubbing element assembly 600 has a housing 602 and rubbing element 604. Housing 602 has a hole 603. Housing 602 is connected to barrel 502. No rotative movement is necessary between barrel 502 and housing 602 on writing implement 500, and, thus, both barrel 502 and housing 602 can be fixed together. Housing 602 has side wall 617. Side wall 617 has an opening 618. Opening 618 is backward C-shape, C-shape, Z-shape or similar shape, having a top portion 619, a middle portion 621 and a bottom portion 623. Rubbing element 604 is the same as rubbing element 204 described herein. Rubbing element assembly 600 has a rubbing element connector 608. Rubbing element connector 608 has a connecting portion 610 and a protrusion 612. Connecting portion 610 has a hole 616. Cartridge 512 is positioned through hole 616 and passes into the passage in rubbing element 604. Protrusion 612 protrudes from connecting portion 610 through opening 618. Connecting portion 610 connects to rubbing element 604 so that rubbing element 604 is movable, in a direction as shown by arrow 614, to selectively extend rubbing element 604 through hole 603 out of housing 602 to an extended position, similar to the extended position of rubbing element 204 shown in FIG. 4B, and retract rubbing element 604 inside of housing 602 in a retracted position.

In use, a user grips protrusion 612 and moves protrusion 612 from top portion 619 of opening 618 to middle portion 621, and, then, from middle portion 621 to bottom portion 623 of opening 618 to move rubbing element 604 from the retracted position to the extended position. Positioning protrusion 612 in bottom portion 623 of opening 618 prevents movement of protrusion 612 in a direction that is opposite to the direction as shown by arrow 614 so that rubbing element 604 is maintained in the extended position when the user is erasing with rubbing element 604. This forms a blocking system for withstanding the vertical erasing force when the user is erasing with rubbing element 604. The user grips protrusion 612 and moves protrusion 612 from bottom portion 623 of opening 618 to middle portion 621, and, then, from middle portion 621 to top portion 619 of opening 618 to move rubbing element 604 from the extended position to the retracted position. Positioning protrusion 612 in top portion 619 of opening 618 prevents movement of protrusion 612 in the direction as shown by arrow 614 so that rubbing element 604 is maintained in the retracted position when the user moves cartridge 512. This forms a blocking system for maintaining rubbing element 604 inside of housing 602.

Thus, after protrusion 612 is moved to middle portion 621 of opening 618, protrusion 612 "slides" or is activated by a "press" action to initiate the projection/retraction movement of rubbing element 604 from inside of housing 602 to the outside of a front end of housing 602 and vice-versa. Rubbing element assembly 600 selectively extends and retracts rubbing element 604 by action on, or a force applied to, protrusion 612 following direction 614 as a simple translation, or rubbing element 604 can be moved by a click mechanism that is also called a knock mechanism that is known in the art, and, thus, not discussed in detail herein.

When writing tip 110 is moved to the writing position or the stored position and rubbing element 604 is in the extended position, then rubbing element 604 maintained in the extended position. When writing tip 110 is moved to the writing position or the stored position and rubbing element 604 is in the retracted position, then rubbing element 604 maintained in the retracted position. When rubbing element 604 is moved to the extended position or the retracted position and writing tip 110 is in the stored position, then writing tip 110 maintained in the stored position. When rubbing element 604 is moved to the extended position or the retracted position and writing tip 110 is in the writing position, then writing tip 110 maintained in the writing position. To achieve the foregoing, protrusion 612 that is attached to rubbing element 604 is "locked" into top portion 619 to maintain rubbing element 604 in the retracted position or bottom portion 623 to maintain rubbing element 604 in the extended position, and cartridge 512 is "locked" in extended or retracted position by the knock mechanism that is under button 108 that is attached to cartridge 512. To summarize, cartridge 512 and rubbing element 604 have two "locked" positions that are independent from each, due to two special shaped mechanisms. Thus, the extended position and retracted position of cartridge 512 and rubbing element 604 are independent or opposite to each other. If rubbing element 604 extends at the same time as cartridge 512, then rubbing element 604 must have an offset compared with the pen tip of cartridge 512, otherwise, the user will rub at the same time he or she writes. Accordingly, rubbing element 604 can be selectively stored and exposed for use in writing implement 500 avoiding damage or accumulation of dirt that can lead to diminished effectiveness for erasing or changing color of markings.

Thus, rubbing element 604 is operated by rubbing element assembly 600 that is separate from writing tip assembly 504. Writing tip assembly 504 is disposed at a rear end of barrel 502 and can be operated by click operation. Rubbing element 604 is projected/retracted from inside of housing 602 and moved to the outside of housing 602 at the front end of housing 602 for use. Movement of rubbing element 604 is similar to a moving sleeve, wherein the rubbing element 604 and writing tip 510 are concentric with writing tip 510 being disposed inside of rubbing element 604 and is projected/retracted from inside of rubbing element 604. Protrusion 612 is located on an outer surface of housing 602 and can extend radially from the outside surface of housing 602 or may not extend radially from the outside surface. Rubbing element assembly 600 "slides" or is activated by a "press" action to initiate the projection/retraction movement of rubbing element 604 from inside of housing 602 to the outside of the front end of housing 602 and vice-versa.

Figure 7:
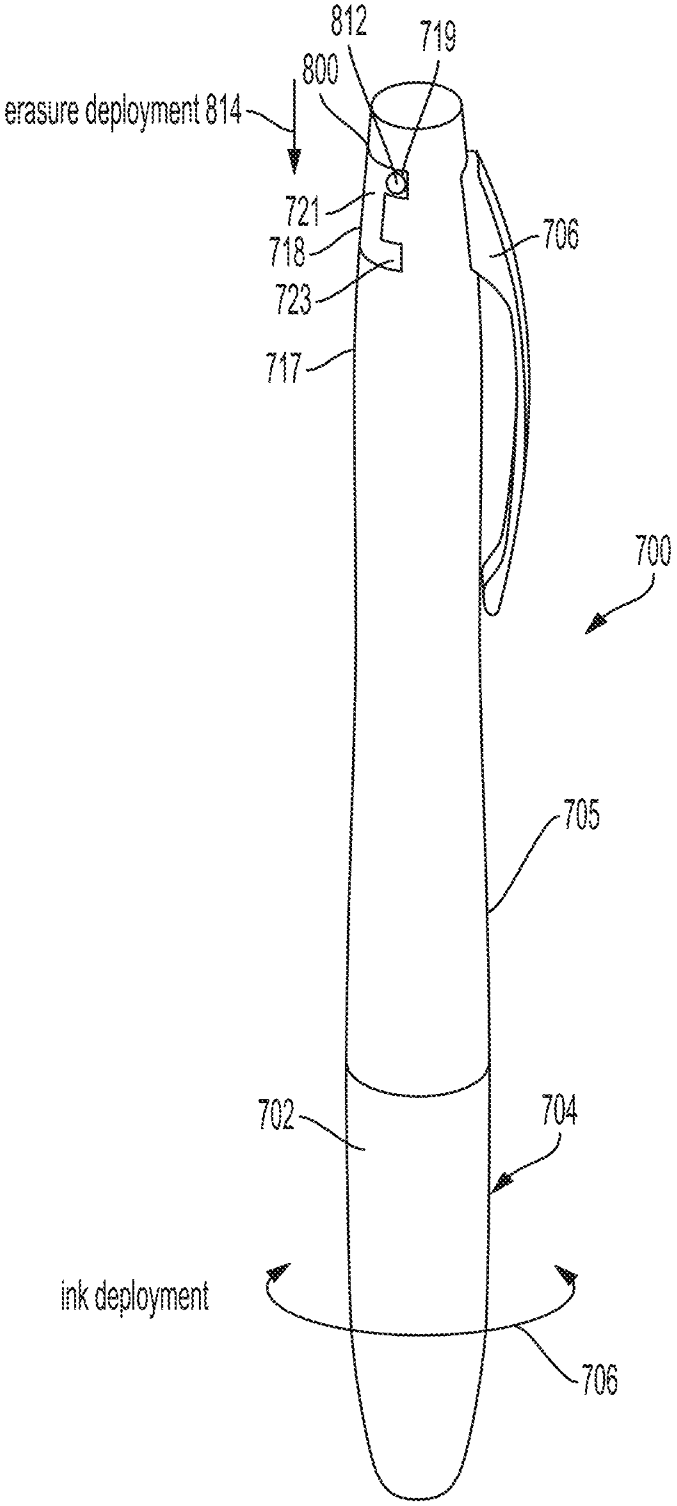
FIG. 7 is a top, side perspective view of a third embodiment of a writing implement having a writing tip in a stored position and a rubbing element in a retracted position.
Figure 8:
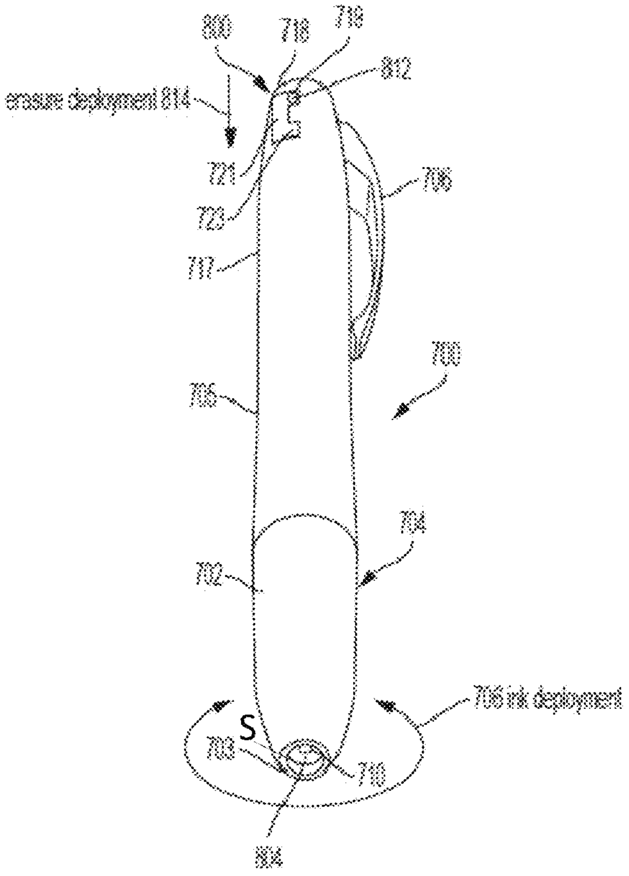
FIG. 8 is a bottom, side perspective view of the third embodiment of the writing implement of FIG. 7.

Referring to FIGS. 7 and 8, a third embodiment of a writing implement 700 of the present disclosure is shown. Writing implement 700 has a writing tip assembly 704, a barrel 705 and a rubbing element assembly 800. Writing implement 700 can also have a clip 706. Barrel 705 has side wall 717. Side wall 717 has an opening 718. Opening 718 is C-shape, backward C-shape, Z-shape or similar shape, having a top portion 719, a middle portion 721 and a bottom portion 723. Rubbing element assembly 800 has a rubbing element 804 and a protrusion 812 that is accessible through opening 718. Writing tip assembly 704 has a housing 702. Housing 702 has a hole 703. Housing 702 is rotatable relative to barrel 705, as shown by arrows 706, to selectively extend writing tip 710, shown in FIG. 9, through hole 703 out of housing 702 and retract writing tip 710 inside of housing 702.

Figure 9:
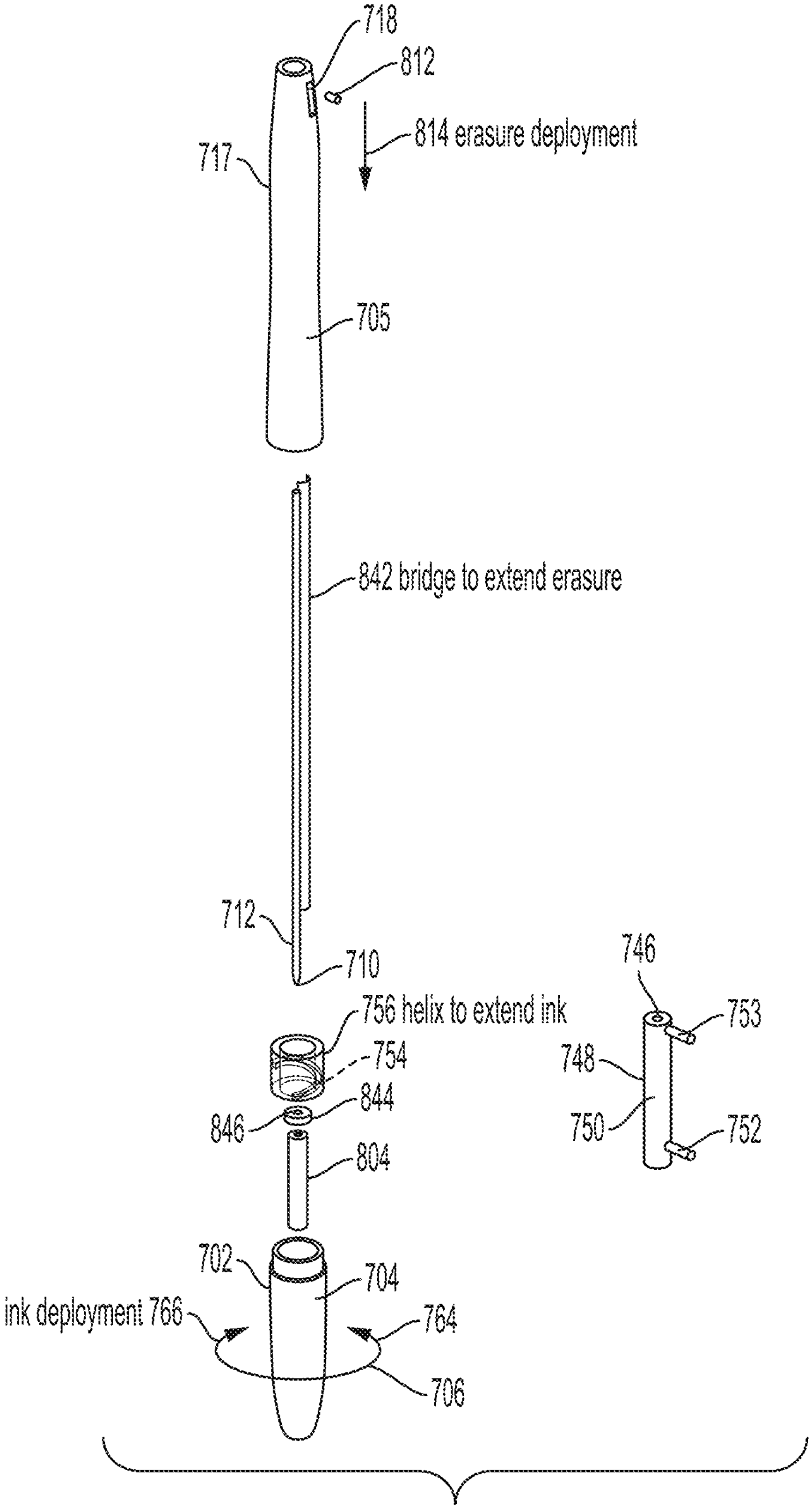
FIG. 9 is an exploded top, side perspective view of the third embodiment of the writing implement of FIG. 7.
Figure 10:
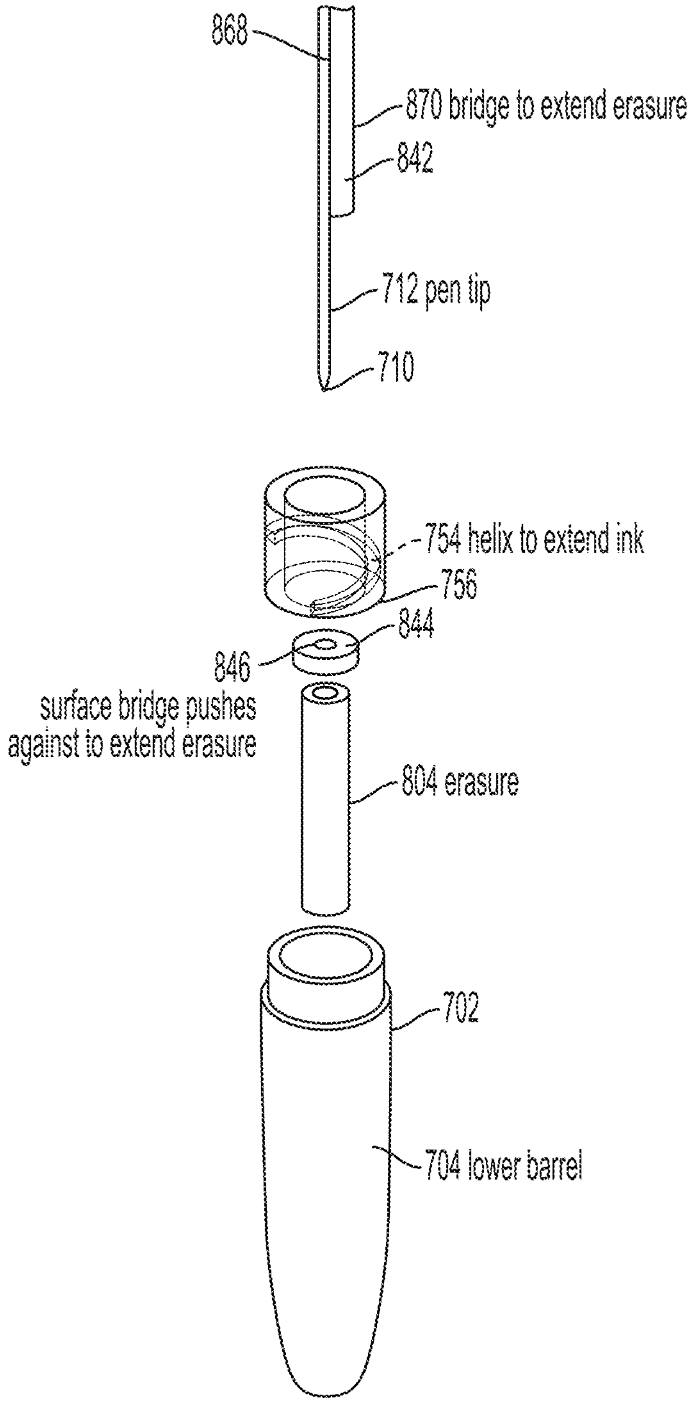
FIG. 10 is an exploded partial, top, side perspective view of the third embodiment of the writing implement of FIG. 7 having a receiving portion removed.

Referring to FIGS. 9 and 10, protrusion 812 is connected to a bridge 842. When assembled, land 844 is connected to bridge 842. Rubbing element 804 is connected to land 844.

Referring in particular to FIG. 9, writing tip 710 is connected to a cartridge 712 that holds thermochromic ink. Cartridge 712 passes through in a hole 746 in a ring 748 so that cartridge 712 is fixed with ring 748 because ring 748 is the element that enables cartridge 712 to actuate from the retracted position to the extended position and vice versa. Ring 748 has a receiving portion 750, a projection 752 and an extension 753. Barrel 705 has an interior surface that has a groove similar to groove 105 of FIG. 4 described herein. The groove in the interior surface of barrel 705 has a shape and size to allow vertical movement of extension 753 between a first end of the groove and a second end of the groove. The groove has a shape and size to prevent rotational movement of extension 753 relative to barrel 705. Cartridge 712 passes through an opening 846 in land 844 into a passage in rubbing element 804. Rubbing element 804 is the same as rubbing element 204 described herein. Cartridge 712, opening 846 and rubbing element 804 are sized so that cartridge 712 can move in opening 846 and rubbing element 804 without modifying positions of opening 846 and rubbing element 804. Projection 752 is inside a thread 754 in a band 756. Ring 748 is sized so that ring 748 fits in band 756. Bridge 842 can either be between receiving portion 750 and band 756 or outside of band 756 so that band 756 accommodates rotational movement of band 756, bridge 842, or band 756 and bridge 842 relative to one another. Bridge 842 can have a convex shape to abut a portion of band 756 so that bridge 842 guides movement of ring 748 in the direction shown by arrow 814 and in a direction opposite the direction shown by arrow 814. Band 756 is connected inside of housing 702. An alternative that is not shown replaces band 756 with opening through housing 702 that has a helix shape similar to opening 1177 described herein.

In use, when rubbing element 804 is in a stored position, a force applied to protrusion 812 moves protrusion 812 from top portion 719 of opening 718 to middle portion 721, and, then, from middle portion 721 to bottom portion 723 of opening 718 to move rubbing element 804 from the retracted position to the extended position, similar to the extended position of rubbing element 204 shown in FIG. 4B, outside of housing 702. Positioning protrusion 812 in bottom portion 823 of opening 818 prevents movement of protrusion 812 in a direction that is opposite to the direction as shown by arrow 814 so that rubbing element 804 is maintained in the extended position when the user is erasing with rubbing element 804. This forms a blocking system for withstanding the vertical erasing force when the user is erasing with rubbing element 804. The user grips protrusion 812 and moves protrusion 812 from bottom portion 723 of opening 718 to middle portion 721, and, then, from middle portion 721 to top portion 719 of opening 718 to move rubbing element 804 from the extended position to the retracted position. Positioning protrusion 812 in top portion 719 of opening 718 prevents movement of protrusion 812 in the direction as shown by arrow 814 so that rubbing element 804 is maintained in the retracted position when the user moves cartridge 712. This forms a blocking system for maintaining rubbing element 804 inside of housing 702.

After protrusion 812 is moved to middle portion 721 of opening 718, bridge 842 selectively extends and retracts rubbing element 804 by protrusion 812 that "slides" or is activated by a "press" action to initiate the projection/retraction movement of rubbing element 804 from inside of housing 702 to the outside of a front end of housing 702 and vice-versa. Rubbing element assembly 800 selectively extends and retracts rubbing element 804 by action on, or a force applied to, protrusion 812 following direction 814 as a simple translation. Accordingly, rubbing element 804 can be selectively stored and exposed for use in writing implement 800 avoiding damage or accumulation of dirt that can lead to diminished effectiveness for erasing or changing color of markings.

To extend writing tip 710 from a stored position, a user grips barrel 705 and housing 702 and rotates one of or both of housing 702 in a direction as shown by arrow 764 and barrel 705 in a direction as shown by arrow 766 so that projection 752 rotates along thread 754 moving writing tip 710 in the direction as shown by arrow 814 out of hole 703 to be outside of housing 702 to a writing position. Since extension 753 is in the groove in the interior surface of barrel 705, ring 748 and cartridge 712 that is connected to ring 748 do not rotate relative to barrel 705 moving protrusion 752 along thread 754 and extension 753 along the groove in the interior surface of barrel 705 to move extension 753 and writing tip 710 in direction 814 relative to barrel 705. To retract writing tip 710 from the writing position, the user grips barrel 705 and housing 702 and rotates one of or both of housing 702 in a direction as shown by arrow 766 and barrel 705 in a direction as shown by arrow 764 so that projection 752 rotates along thread 754 moving writing tip 710 in the direction opposite to the direction as shown by arrow 814 to be inside of housing 702 to the stored position. Since extension 753 is in the groove in the interior surface of barrel 705, ring 748 and cartridge 712 that is connected to ring 748 do not rotate relative to barrel 705 moving protrusion 752 along thread 754 and extension 753 along the groove in the interior surface of barrel 705 to move extension 753 and writing tip 710 in direction opposite direction 814 relative to barrel 705. When user rotates housing 702, writing tip 710 is extended or retracted depending on the direction of the rotation, e.g., direction of arrow 764 or direction of arrow 766 and writing tip 710 is retracted by the rotation of housing 702, therefore, bridge 842 and cartridge 712 are independent from one other.

Thus, rubbing element 804 is disposed inside housing 702. Rubbing element 804 is operated by rubbing element assembly 800. Rubbing element assembly 800 can be protrusion 812 or a clip located at a rear end of barrel 705. Rubbing element assembly 800 is separate from writing tip assembly 704. Writing tip assembly 704 is disposed at a front end of barrel 705. Writing tip assembly 704 is a portion of a front end of barrel 705, namely the portion of the front end of barrel 705 "twists/rotates" to initiate a projection/retraction movement of writing tip 710 from inside of rubbing element 804 to the outside of the front end of housing 702 and vice-versa. To summarize, rubbing element 804, bridge 842, land 844 and protrusion 812 are moved by a translation movement in the direction shown by arrow 814 and opposite the direction shown by arrow 814 between the retracted position and the extended position. Writing tip 710, cartridge 712 and ring 748 are moved between the retracted position and the extended position by a twisting mechanism including band 756. To enable the translation of writing tip 710, ring 748 should be keyed by extension 753 positioned in the groove in the interior surface of barrel 705 so that ring 748 can only translate in the direction shown by arrow 814 and opposite the direction shown by arrow 814 relative to barrel 705 and rotation of ring 748 relative to barrel 705 is prevented.

Rubbing element 804 is projected/retracted from inside of housing 702 and moved to an outside of housing 702 by a "slide" action, for example, by a clip linked with protrusion 812 or bridge 842 or similar structure located at the rear end of barrel 705. Movement of rubbing element 804 would be similar to a moving sleeve, namely rubbing element 804 and writing tip 710 are concentric with writing tip 710 being disposed inside of rubbing element 804 and is projected/retracted from inside of rubbing element 804. Accordingly, rubbing element 804 can be selectively stored and exposed for use in writing implement 700 avoiding damage or accumulation of dirt that can lead to diminished effectiveness for erasing or changing color of markings. As shown by the lines in FIG. 8, space S can be created between rubbing element 804 and housing 702. Rubbing element 804 can be sized so that when rubbing element 804 is extended out of hole 703 in housing 702 there is space S created between rubbing element 804 and an end of housing 702 where hole 703 is located.

Figure 11:
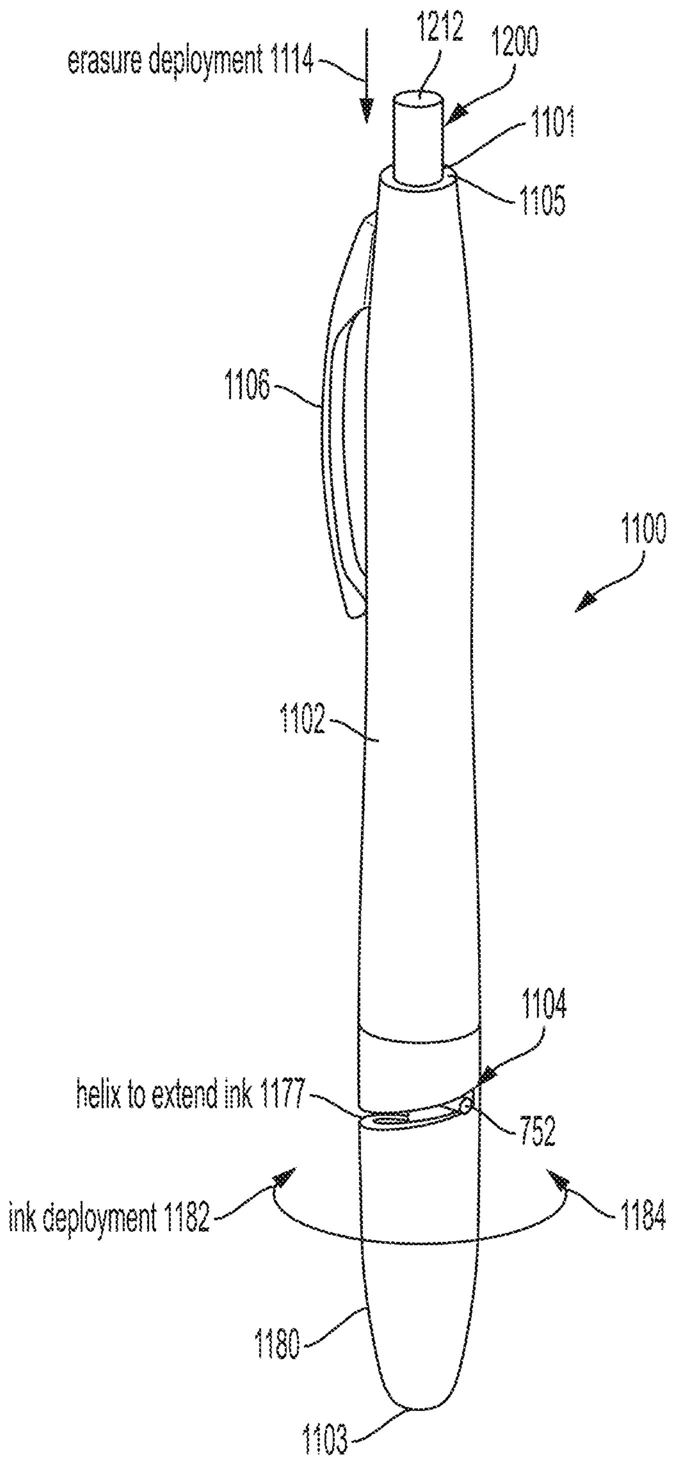
FIG. 11 is a top, side perspective view of a fourth embodiment of a writing implement having a writing tip in a stored position and a rubbing element in a retracted position.
Figure 12:
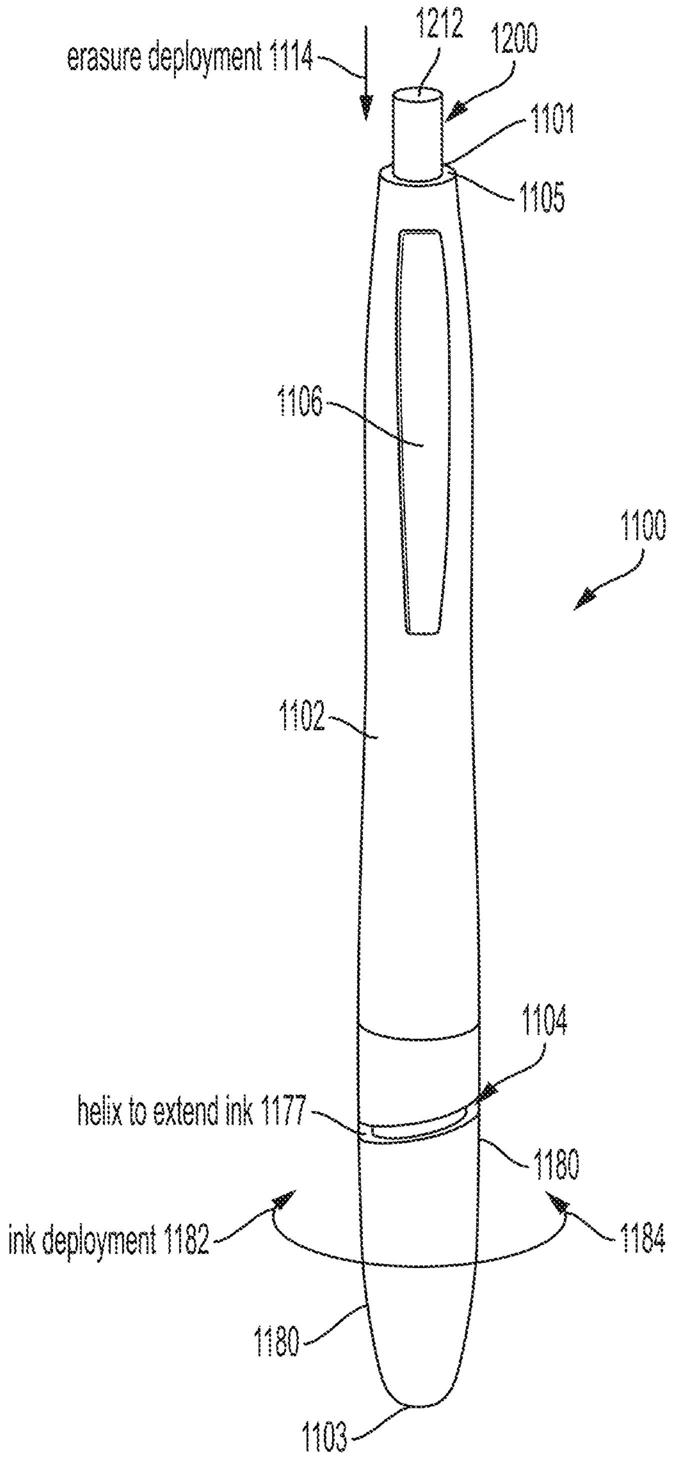
FIG. 12 is a top, front perspective view of the fourth embodiment of FIG. 11.
Figure 13:
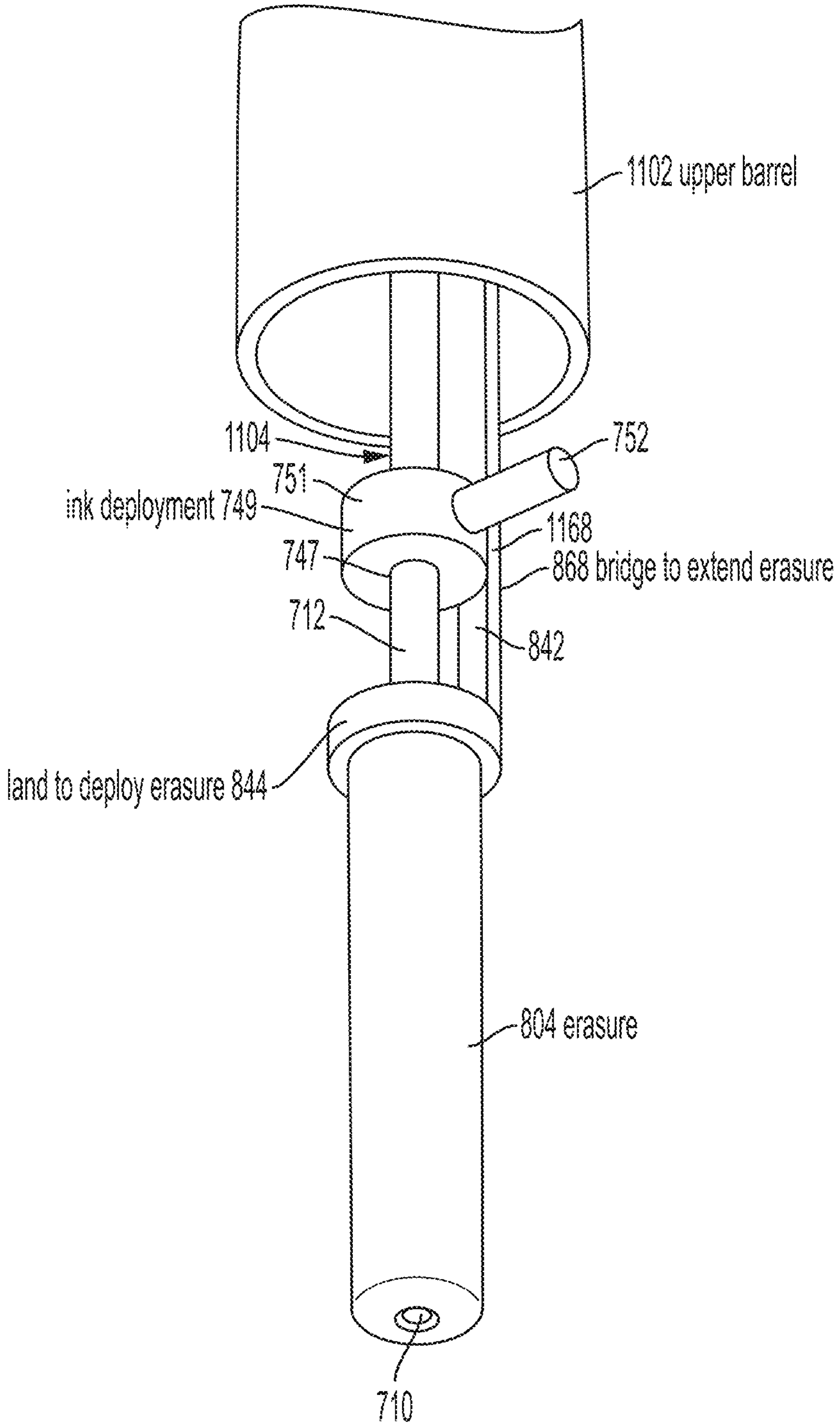
FIG. 13 is a partial bottom, side perspective view of the fourth embodiment of the writing implement of FIG. 11 showing a housing removed.

Referring to FIGS. 11-13, a fourth embodiment of a writing implement 1100 that has a barrel 1102, a writing tip assembly 1104 and a rubbing element assembly 1200 of the present disclosure is shown.

Referring again to FIG. 13, barrel 1102 is the same as barrel 705 except barrel 1102 has opening 1101 at barrel end 1105 instead of opening 718 in side wall 717 and barrel 1102 does not include the groove on the interior surface of barrel 705. Rubbing element assembly 1200 is the same as rubbing element assembly 800 except rubbing element assembly 1200 has bridge 842 connected to button 1212 through opening 1101 instead of protrusion 812 so that rubbing element 804 is moved up and down by a pressure on button 1212 via a click/knock/ratchet system located in the top of barrel 1102 instead of movement of protrusion 812 in opening 718. Accordingly, features that are the same for rubbing element assembly 1200 and rubbing element assembly 800 have the same reference numerals. Writing tip assembly 1104 has the same cartridge 712 and writing tip 710 as writing tip assembly 704, and, accordingly, the same reference numerals are used for cartridge 712 and writing tip 710 of writing tip assembly 1104. Writing tip assembly 1104 has ring 749 instead of ring 748. Ring 749 has protrusion 752; however, ring 749 does not include extension 753. Cartridge 712 and ring 749 are not connected to and are free of barrel 1102. Cartridge 712 passes through hole 747 in a body 751 of ring 749 so that ring 749 and cartridge 712 are fixed with each other. Rotation and translation of cartridge 712 relative to ring 749 is prevented so when protrusion 752 extending from ring 749 travels in opening 1177, cartridge 712 moves downward or upward. Ring 749 can abut bridge 842 so that movement of ring 749 and cartridge 712 is guided by bridge 842 in a direction as shown by arrow 1114 and in a direction opposite to the direction as shown by arrow 1114. Cartridge 712 passes through opening 846 in land 844 into the passage in rubbing element 804. Cartridge 712, opening 846 and rubbing element 804 are sized so that cartridge 712 can move in opening 846 and rubbing element 804 without modifying positions of each of opening 846 and rubbing element 804 and movements of cartridge 712 and rubbing element 804 are independent. Projection 752 is positioned inside opening 1177 in housing 1180. Housing 1180 is connected to barrel 1102 so that barrel 1102 and housing 1180 are in a fixed position relative to one another. Opening 1177 is sized so that projection 752 can rotate from a first side 868 of bridge 842 to a second side 870 of bridge 842 a distance along opening 1177 that is long enough to extend writing tip 710 to the writing position.

In use, to extend writing tip 710 from a stored position, a user grips projection 752 and housing 1180 or barrel 1102 and rotates one of or both of projection 752 in a direction as shown by arrow 1182 and housing 1180 or barrel 1102 in a direction as shown by arrow 1184 so that projection 752 rotates along opening 1177 moving writing tip 710 in the direction as shown by arrow 1114 out of hole 1103 to be outside of housing 1180 to a writing position. To retract writing tip 710 from the writing position, the user grips projection 752 and housing 1180 or barrel 1102 and rotates one of or both of projection 752 in the direction as shown by arrow 1184 and housing 1180 or barrel 1102 in the direction as shown by arrow 1182 so that projection 752 rotates along opening 1177 moving writing tip 710 in a direction opposite the direction as shown by arrow 1114 to be inside of housing 1180 to the stored.

Rubbing element 804 is disposed inside housing 1180. Rubbing element 804 is operated by a rubbing element assembly 1200. Rubbing element assembly 1200 is located on an outer surface of barrel 1102 and can extend axially relatively to the barrel 1102. Rubbing element assembly 1200 is activated by a "press" action to initiate the projection/retraction movement of the rubbing element 804 from inside of housing 1180 to the outside of the front end of housing 1180 and vice-versa. Rubbing element assembly 1200 is separate from writing tip assembly 1104. Writing tip assembly 1104 is disposed at the front end of housing 1180. Writing tip assembly 1104 has a portion of a front end of writing implement 1100, namely housing 1180, or protrusion 752 that "twists/rotates" to initiate a projection/retraction movement of writing tip 710 from inside of rubbing element 804 to an outside of housing 1180 and vice-versa. Rubbing element 804 is projected/retracted from inside housing 1180 and moved to the outside of housing 1180 by pressing on button 1212 located at the rear end of barrel 1102. Movement of rubbing element 804 would be similar to a moving sleeve, namely rubbing element 804 and writing tip 710 are concentric and writing tip 710 is disposed inside of rubbing element 804 and is projected/retracted from inside of rubbing element 804. Accordingly, rubbing element 804 can be selectively stored and exposed for use in writing implement 1100 avoiding damage or accumulation of dirt that can lead to diminished effectiveness for erasing or changing color of markings.

Figure 14:
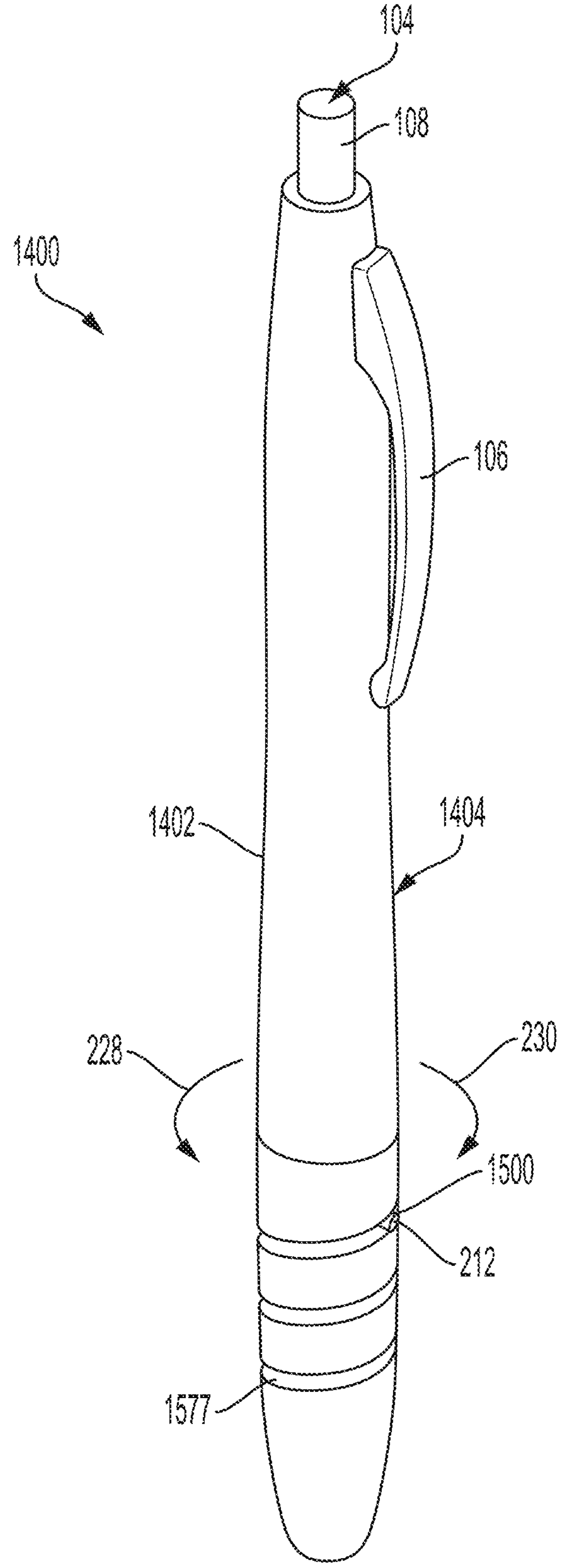
FIG. 14 is a top, side perspective view of a fifth embodiment of a writing implement having a writing tip in a stored position and a rubbing element in a retracted position.
Figure 15:
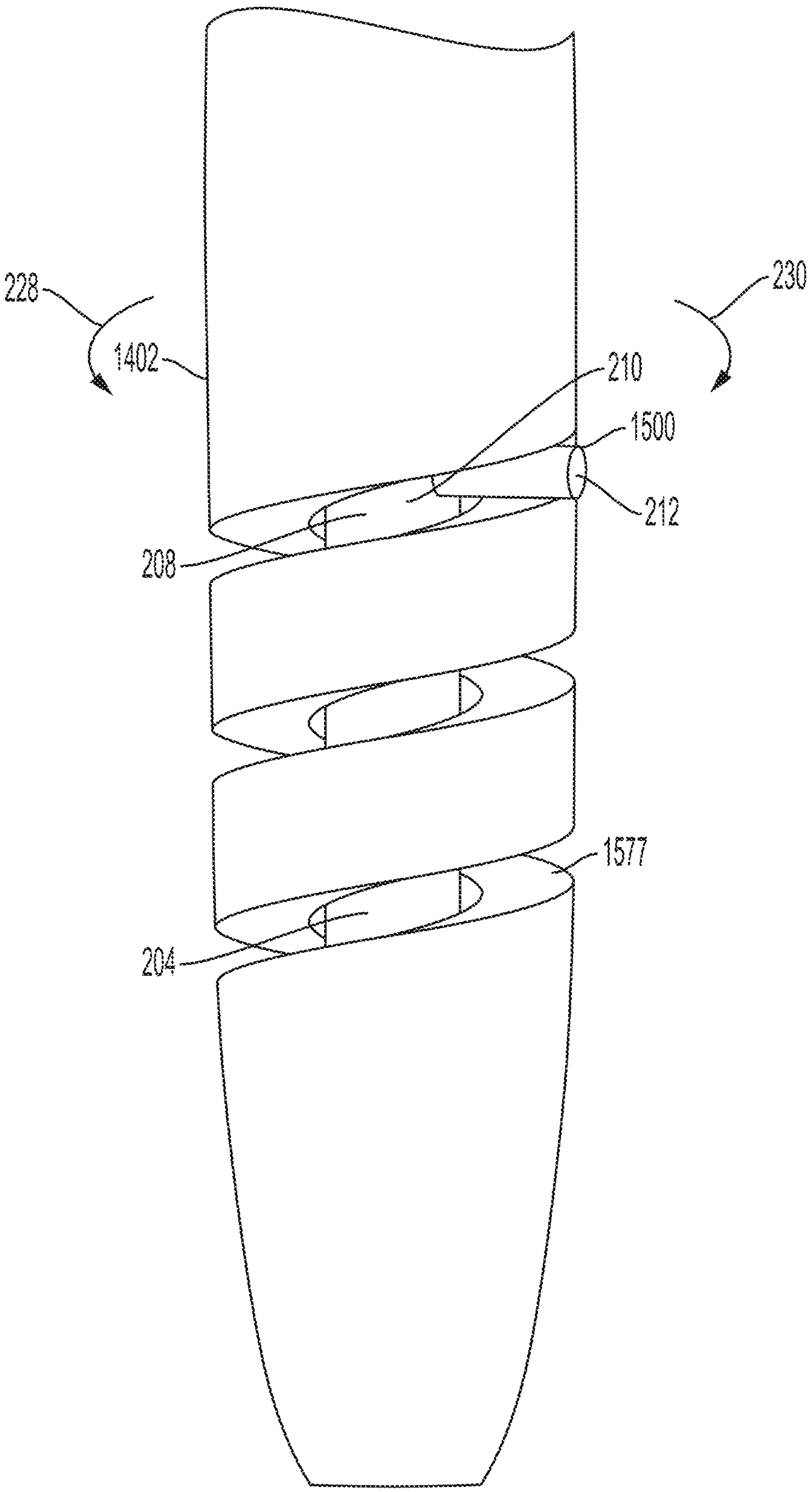
FIG. 15 is a partial top, side perspective view of the fifth embodiment of FIG. 14.

Referring to FIGS. 14 and 15, a fifth embodiment of a writing implement 1400 of the present disclosure. Writing implement 1400 has a barrel 1402, a writing tip assembly 1404 and a rubbing element assembly 1500 of the present disclosure is shown. Rubbing element assembly 1500 is the same as rubbing element assembly 200 except rubbing element assembly 1500 has an opening 1577 in barrel 1402 instead of a thread 222 in housing 202 and does not include extension 213 and groove 102. Writing tip assembly 1404 is the same as writing tip assembly 104. Opening 1577 is in the shape of a helix. Accordingly, features that are the same for writing implement 1400 and writing implement 100 have the same reference numerals. In use, to move rubbing element 204 from the retracted position to the extended position, a user grasps barrel 1402 and protrusion 212 and rotates one or both of barrel 1402 in the direction as shown by arrow 228 and protrusion 212 in the direction as shown by arrow 230 to move rubbing element 204 to the extended position. To move rubbing element 204 from the extended position to the retracted position, a user grasps barrel 1402 and protrusion 212 and rotates one or both of barrel 1402 in the direction as shown by arrow 228 and protrusion 212 in the direction as shown by arrow 230 to move rubbing element 204 to the retracted position.

Accordingly, rubbing elements 204, 604, 804 can be stored when not in use so that rubbing elements 204, 604, 804 are not exposed at all times. Thus, exposure that can lead to damage or accumulation of dirt leading to diminished effectiveness for erasing or changing color of markings of rubbing elements 204, 604, 804 is minimized. Rubbing element 204, 604, 804 also does not contact any surface of barrels 102, 502, 705, 1102, 1402 or housings 202, 602, 704, 1180 during extending and retracting. This prevents damage or soiling of rubbing elements 204, 604, 804 as well. Rubbing elements 204, 604, 804 extend past writing tips when both are in extended positions in writing implements 100, 500, 700, 1100, 1400 so as to prevent accidental markings by the writing tips.

The present disclosure having been thus described with particular reference to some examples or embodiments thereof, it will be understood by those skilled in the art that other alternatives and obvious modifications and equivalents thereof are possible. Furthermore, the present disclosure covers all possible combinations of the particular embodiments described. Thus, the scope of the present disclosure should not be limited by the particular embodiments, but should be determined only by a fair reading of the appended claims.

It should be noted that the terms “first”, “second”, “third”, “fourth”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure will not be limited to the particular embodiment(s) disclosed as the best mode contemplated, but that the disclosure will include all embodiments falling within the scope of the appended claims.

The invention claimed is:

1. A writing implement comprising:

a barrel;

a writing tip assembly having a writing tip selectively extendable from the barrel for writing and retractable into the barrel to prevent writing; and a retractable rubbing element that surrounds the writing tip that is selectively extendable from a housing to erase or change color of the writing and retractable into the housing for storage, wherein the rubbing element is extended and retracted by a rubbing element assembly that is a first retraction mechanism, wherein the writing tip is extendable for writing and retractable for storage by a second retraction mechanism that is separate from the first retraction mechanism, and wherein the first retraction mechanism has a first user engageable portion that is separate from a second user engageable portion of the second retraction mechanism.

2. The writing implement of claim 1, wherein the extension and retraction of the writing tip is independent of the extension and retraction of the rubbing element.

3. The writing implement of claim 1, wherein the extension and retraction of the writing tip is opposite to the extension and retraction of the rubbing element.

4. The writing implement of claim 1, wherein in an extended position of the rubbing element, the rubbing element is maintained by a blocking system and the writing tip is moved to its retracted position.

5. The writing implement of claim 1, wherein the rubbing element is maintained in a retracted position by a blocking system, when the writing tip is moved to its extended position.

6. The writing implement of claim 1, wherein the rubbing element is supported by an interior of the housing.

7. The writing implement of claim 1, wherein the rubbing element is connected to a ring that surrounds a portion of the writing tip assembly.

8. The writing implement of claim 7, wherein the ring is supported by an interior of the housing.

9. The writing implement of claim 7, wherein the rubbing element is extendable out of the housing so that there is a space created between the rubbing element and the housing.

10. The writing implement of claim 7, wherein the rubbing element is sized so that when the rubbing element is extended out of a hole in the housing there is a space created between the rubbing element and an end of the housing where the hole is located.

11. The writing implement of claim 1, wherein the first user engageable portion extends from a side surface of the barrel.

12. The writing implement of claim 11, wherein the second user engageable portion extends from a rear end of the barrel that is opposite a front end of the barrel in which the rubbing element extends.

13. The writing implement of claim 12, wherein the first retraction mechanism is configured to move the rubbing element by twisting the first user engageable portion.

14. The writing implement of claim 12, wherein the second retraction mechanism is configured to move the writing tip by moving the second user engageable portion into and out of the barrel in a longitudinal direction.

15. The writing implement of claim 1, wherein the rubbing element is made of cork.

16. The writing implement of claim 1, wherein the rubbing element is made of a material that is able to transfer enough heat to a paper such that changes color of a thermochromic ink, wherein the material is selected from the group consisting of kneading silicone material, thermoplastic polyurethane polyether and any combinations thereof.

* * * * *